United States Patent
Zider et al.

[11] Patent Number: 6,164,775
[45] Date of Patent: Dec. 26, 2000

[54] SYSTEM FOR REMOVABLY ATTACHING LENSES TO EYEGLASS FRAME

[75] Inventors: Robert B. Zider, Portola Valley; John F. Krumme, Tahoe City, both of Calif.

[73] Assignee: Beta Frames, L.L.C., Menlo Park, Calif.

[21] Appl. No.: 09/289,161

[22] Filed: Apr. 9, 1999

Related U.S. Application Data

[60] Provisional application No. 60/081,478, Apr. 10, 1998.

[51] Int. Cl.[7] .................................................. G02C 1/00
[52] U.S. Cl. ............................. 351/86; 351/41; 351/83; 351/90; 351/91; 351/92; 351/110
[58] Field of Search ............................... 351/41, 86, 110, 351/83, 90, 91, 92

[56] References Cited

U.S. PATENT DOCUMENTS

| | | |
|---|---|---|
| 2,851,925 | 9/1958 | Cretin-Maitenaz ........................ 351/92 |
| 4,895,438 | 1/1990 | Zider et al. . |
| 4,896,955 | 1/1990 | Zider et al. ............................... 351/41 |
| 5,452,028 | 9/1995 | Iijima ....................................... 351/124 |
| 5,640,217 | 6/1997 | Hautcoeur et al. ........................ 351/41 |
| 5,861,933 | 1/1999 | Bac .......................................... 351/110 |

*Primary Examiner*—Georgia Epps
*Attorney, Agent, or Firm*—Burns, Doane, Swecker & Mathis, L.L.P.

[57] ABSTRACT

A system for attaching optical frames and lenses is described which provides positive, reversible attachment without rims, cords, or screws. The mating is performed with a mechanical closure onto a receiving portion of the lens which has been formed as the mating piece for the closure device. Lenses may be changed and adjusted in a straightforward manner and the resulting device presents a clean, fashionable appearance without the need for structural rims, cords, or screws.

19 Claims, 5 Drawing Sheets

SYSTEM FOR REMOVABLY ATTACHING LENSES TO EYEGLASS FRAME

This application claims priority under 35 U.S.C. §§119 and/or 365 to 60/081,478 filed in United States on Apr. 10, 1998; the entire content of which is hereby incorporated by reference.

FIELD OF THE INVENTION

The invention relates to mechanisms for holding lenses in eyeglass frames.

BACKGROUND OF THE INVENTION

The primary attachment system used today for lenses is a standard, full circumferential eyeglass frame 1 (FIGS. 1 and 2), either of plastic or metal. The rim 2 surrounds the lens 4, holding it in place. The lens 4 itself will typically have a ridge 6 around the full circumference to allow for the holding of the lens 4 in place (FIGS. 1 and 2). This system has been in place for hundreds of years and represents the basic state of the art.

Another system which has been in place for many years is the "three piece" fixation system. In this form, the eyeglass frame is actually in three pieces with "fingers" extending into the lens into which holes have been drilled and screws affixed (FIGS. 3 and 4). This also has been used for hundreds of years and dates back to some of the earliest eyeglass uses. In addition to the traditional three piece with screws through the lens, a more recent adaptation is that by Air Titanium whereby folded metal rods are inserted through holes in the lens and the opening tension produced by the oversize, bent rods fixes the lens and frame, without the use of screws. This system, however, while reversible, does not provide sufficient structural integrity, and requires intrusion into the lens.

A newer connection system is that of a "half rim" 24 (FIGS. 5 and 6) where structural material is used such as in a full circumferential metal rim, but only through part of the frame. The remainder of the lens is supported through a cord 26, or cable, typically of nylon, which, when put in tension, holds the lens 28 in place by virtue of its fitting in a groove 30 in the lens (FIGS. 5 and 6). An example of this is the Essilor "rimless" frame, which patent issued around 1970.

Other lens systems have been proposed, which include permanently fixing the frame to the lens with pieces such as glue or epoxy. Those have not found significant applications because of their inability to be replaced, requiring full replacement of both the lens and the frame.

A newer method of attachment is described in U.S. Pat. No. 4,895,438 which discloses the use of shape memory 32 alloys to grab onto lens 34, thus providing a reversible positive connection without rims, cords, or screws (FIGS. 7 and 8).

SUMMARY OF THE INVENTION

The invention provides an eyeglass lens attachment arrangement comprising an eyeglass frame and a pair of lenses, each of the lenses including at least one shaped engaging portion, the shaped engaging portion cooperating with an attachment member which attaches a respective one of the lenses to the frame. The shaped engaging portion can comprise a recess in the lens or a projection on the lens. Alternatively, the engaging portion can comprise a discrete part bonded to the lens. Although a single engaging portion could be utilized, more preferably first and second shaped engaging portions are provided on each lens. For instance, each lens can include first and second spaced apart recesses, first and second spaced apart projections or first and second spaced apart discrete parts bonded to the lens.

The attachment member can comprise a separate or integral part of the eyeglass frame removably attached to the shaped engaging portion. For instance, the attachment member can include a pair of fingers which engage the shaped engaging portion. Other attachment member configurations can be used such as a C-shaped, V-shaped, triangular, or other shaped portions engaging the shaped engaging portion. With the arrangement according to the invention, the lens can be removably attached to the frame without screws, cords or rims.

DETAILED DESCRIPTION OF THE INVENTION

Figure 1:
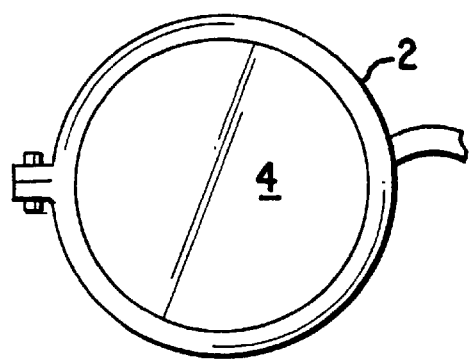
FIGS. 1–8 show prior art arrangements for attaching lenses to eyeglass frames.
Figure 2:
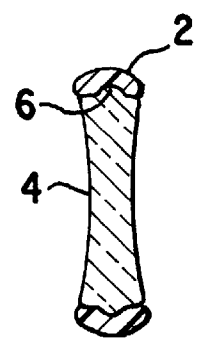
Figure 3:
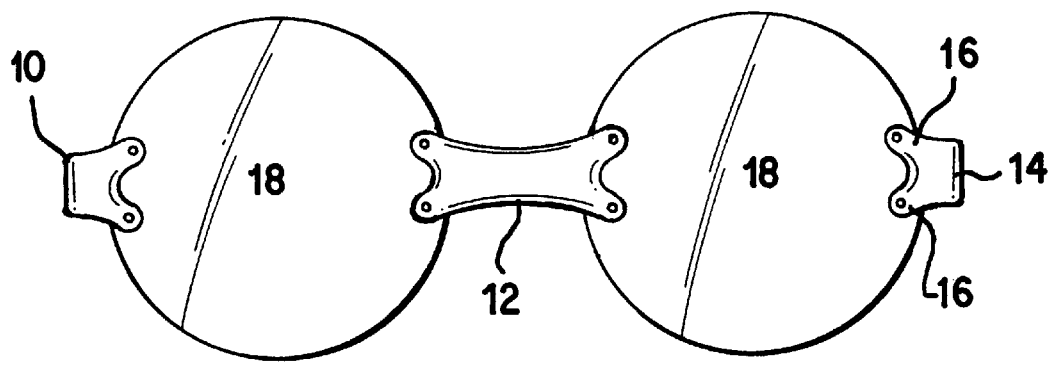
Figure 4:
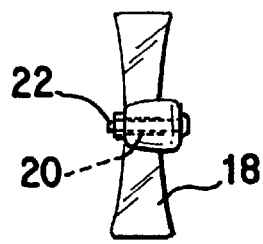
Figure 5:
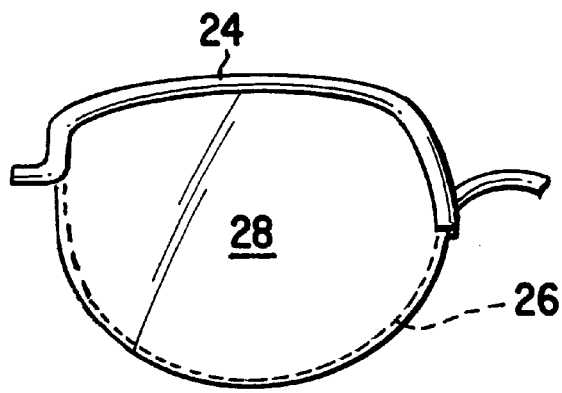
Figure 6:
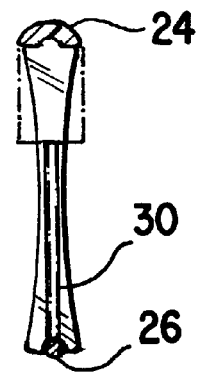
Figure 7:
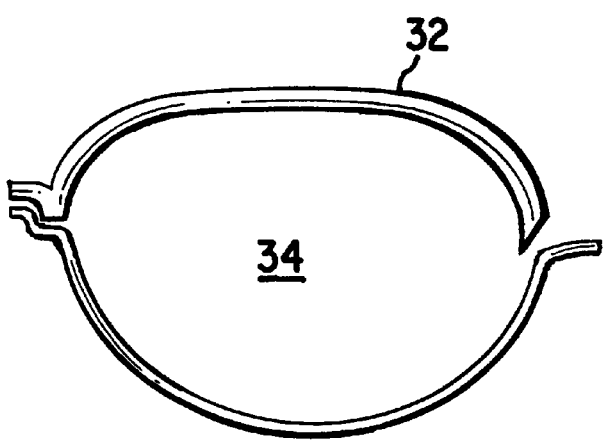
Figure 8:
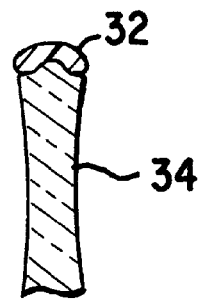
Figure 9:
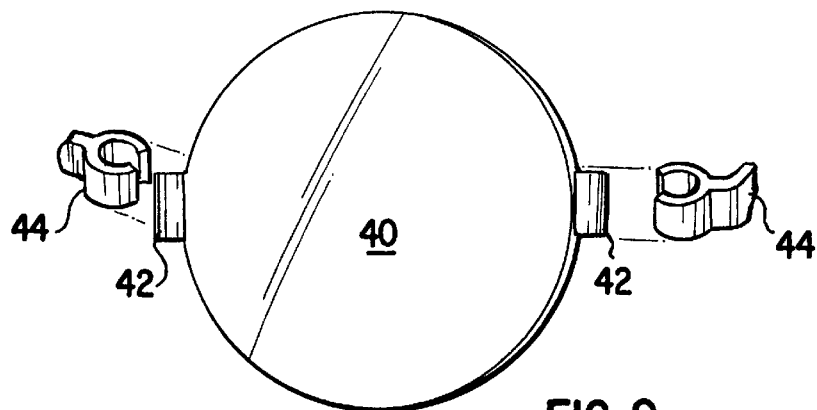
FIGS. 9–17 show various embodiments of shaped engaging portions in accordance with the invention.
Figure 10:
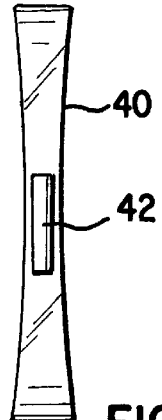
Figure 11:
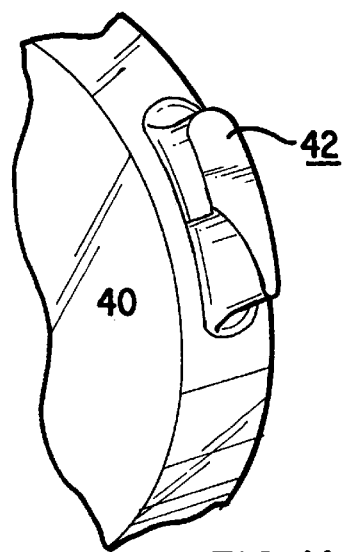
Figure 12:
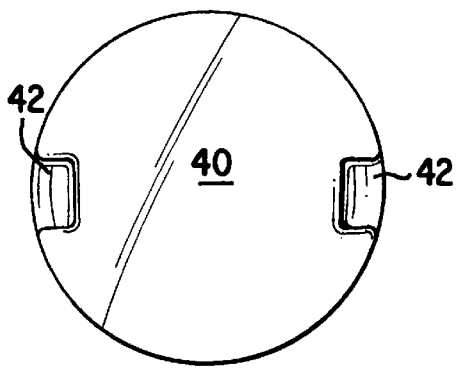
Figure 13:
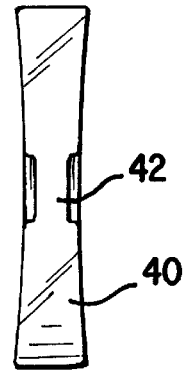
Figure 14:
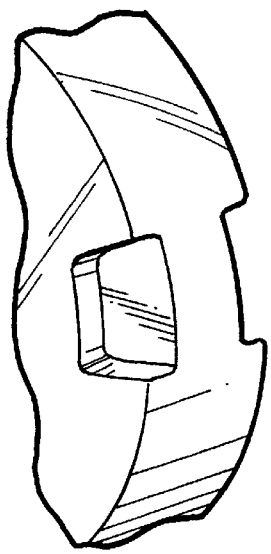

The invention provides a novel lens attachment arrangement. The arrangement utilizes material either on the lens itself or through attachment such as bonding (e.g., epoxying) of a special fitting to the lens which is specifically designed to accommodate various mechanical, reversible frame mating systems such as envisioned in the '438 patent and other non-shape memory alloy embodiments. These connection designs would preferably be the "male" end of a male-female fixation system. In one embodiment (FIGS. 9–11), the lens material 40 itself would be ground away leaving an exposed mating fixture 42 such as a recess or projection which is integral with the lens 40. A male or female attachment member 44 would then grab onto the protruding material 42 either directly, or through a sliding motion such as in the vertical plane. A locking clip could then keep further sliding from taking place. In another mode, the material of the lens 40 would be machined such that the male or female portion 42 is inboard of the circumference of the lens. This could be accessed by techniques such as through the grabbing motion defined in the '438 patent, or a snapping motion provided by an attachment member having an elastic grabbing portion (FIGS. 12–14).

Figure 15:
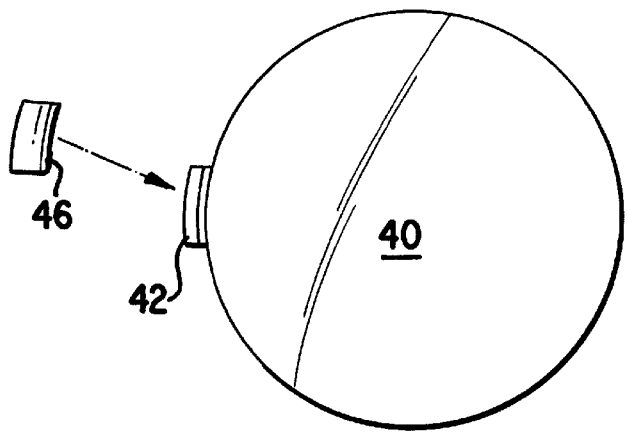
Figure 16:
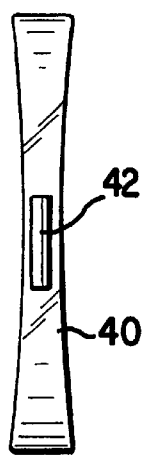
Figure 17:
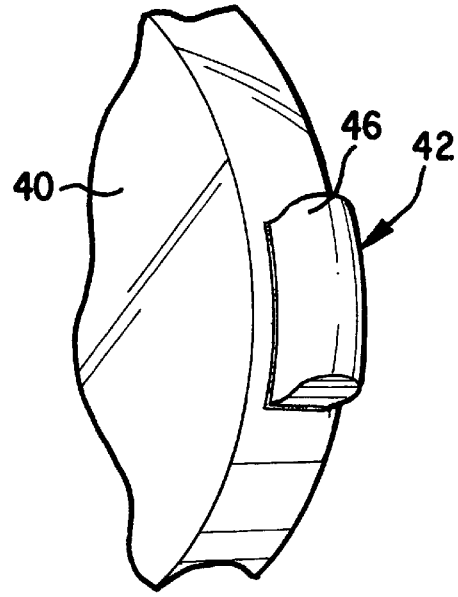

In yet another embodiment, a separate lens engaging portion 46, such as that made by a similar or dissimilar material, such as metal ceramic or plastic material could be permanently attached (e.g., epoxied) onto the lens 40 itself and then the attachment member of the frame could be directly attached to that lens engaging portion 42 (FIGS. 15–17). While the lens engaging portion 42 can be permanently attached to the lens, the lens itself can still be removed and adjusted, coated and cleaned, unlike other permanent fixation methods.

Figure 18:
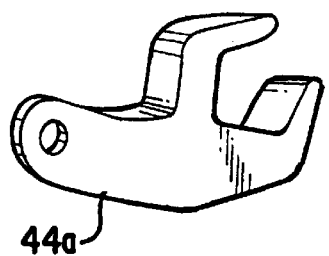
FIGS. 18–23 show various attachment member configurations in accordance with the invention.
Figure 19:
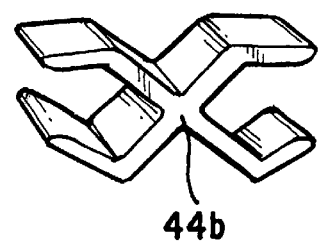
Figure 20:
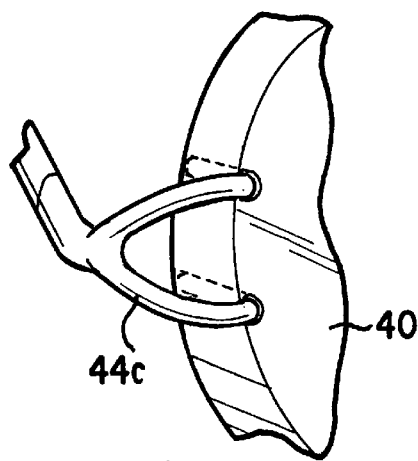
Figure 21:
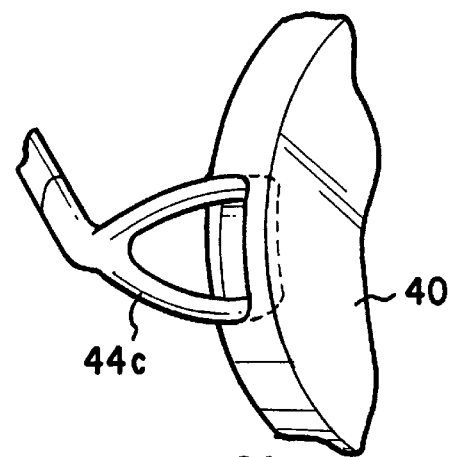
Figure 22:
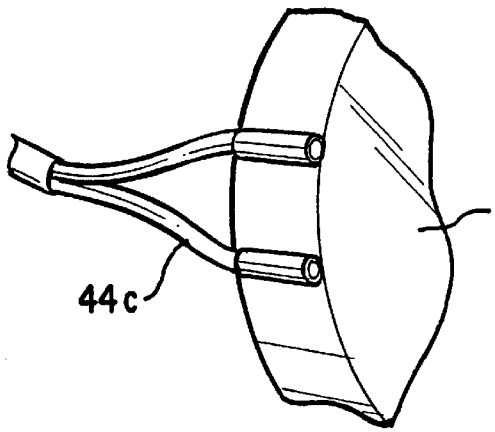
Figure 23:
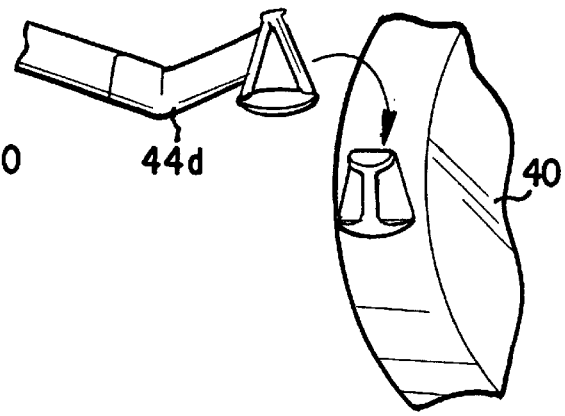

The female and male portions of the attachment arrangement 44 may also be formed in a round or angled pattern (44a, 44b) such that either adjustments or fixation are enhanced (FIGS. 18 and 19). They may also be "forked" (44c) to open or close as in FIGS. 20–22 or press fit or swaged (44d) on as shown in FIG. 23. In the FIGS. 20–21 arrangement, the attachment member can be of materials such as stainless steel, titanium, Beta-titanium, shape memory alloy or other springy material.

In all the embodiments, screws and holes in the lens themselves are not necessary to provide a rimless, cordless, screwless attachment system for optical frames.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

We claim:

1. An eyeglass lens attachment arrangement comprising an eyeglass frame and a pair of lenses, each of the lenses including at least one shaped engaging portion, the shaped engaging portion cooperating with an attachment member which attaches a respective one of the lenses to the eyeglass frame such that the lenses are removably attached to the frame.

2. The eyeglass attachment arrangement of claim 1, wherein the shaped engaging portion comprises a recess in the lens.

3. The eyeglass attachment arrangement of claim 1, wherein the shaped engaging portion comprises a projection on the lens.

4. The eyeglass attachment arrangement of claim 1, wherein the shaped engaging portion comprises a discrete part bonded to the lens.

5. The eyeglass attachment arrangement of claim 1, wherein the shaped engaging portion comprises first and second spaced apart recesses.

6. The eyeglass attachment arrangement of claim 1, wherein the shaped engaging portion comprises first and second spaced apart projections.

7. The eyeglass attachment arrangement of claim 1, wherein the shaped engaging portion comprises first and second spaced apart discrete parts bonded to each lens.

8. The eyeglass attachment arrangement of claim 1, wherein the attachment member is removably attached to the shaped engaging portion.

9. The eyeglass attachment arrangement of claim 1, wherein the attachment member includes a pair of resilient fingers which engage the shaped engaging portion.

10. The eyeglass attachment arrangement of claim 1, wherein the attachment member includes a C-shaped portion engaging the shaped engaging portion.

11. The eyeglass attachment arrangement of claim 1, wherein the lenses are attached to the frame without screws.

12. The eyeglass attachment arrangement of claim 1, wherein the lenses are attached to the frame without cords.

13. The eyeglass attachment arrangement of claim 1, wherein the lenses are attached to the frame without rims.

14. The eyeglass attachment arrangement of claim 1, wherein the attachment member attaches to the shaped engaging portion by slidingly engaging the shaped engaging portion.

15. The eyeglass attachment arrangement of claim 1, wherein the attachment member attaches to the shaped engaging portion by means of a press fit or swage fit.

16. The eyeglass attachment arrangement of claim 1, wherein the attachment member is of a springy material selected from the group consisting of stainless steel, titanium, B-titanium or shape memory alloy.

17. The eyeglass frame attachment arrangement of claim 1, wherein the shaped engaging portion comprises a pair of projections located on opposite sides of each of the lenses.

18. The eyeglass frame attachment arrangement of claim 1, wherein the shaped engaging portion comprises a pair of recesses located on opposite sides of each of the lenses.

19. The eyeglass frame attachment arrangement of claim 1, wherein the attachment member comprises a male or female attachment member which matingly engages the shaped engaging portion so as to removably attach the lenses to the frame.

* * * * *